(12) United States Patent
Hsu et al.

(10) Patent No.: US 11,481,866 B2
(45) Date of Patent: Oct. 25, 2022

(54) MAPPING METHOD FOR FULLDOME DISPLAY

(71) Applicant: Brogent Technologies Inc., Kaohsiung (TW)

(72) Inventors: Chih-Yung Hsu, Kaohsiung (TW); Ting-Chieh Tsai, Kaohsiung (TW); Tak-Hon Lee, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 9 days.

(21) Appl. No.: 17/018,612

(22) Filed: Sep. 11, 2020

(65) Prior Publication Data

US 2022/0020109 A1 Jan. 20, 2022

(30) Foreign Application Priority Data

Jul. 17, 2020 (TW) ................... 109124246

(51) Int. Cl.
*G06T 3/00* (2006.01)
*G06F 3/14* (2006.01)

(52) U.S. Cl.
CPC ............ *G06T 3/005* (2013.01); *G06F 3/1446* (2013.01); *G06T 3/0093* (2013.01)

(58) Field of Classification Search
None
See application file for complete search history.

(56) References Cited

U.S. PATENT DOCUMENTS

| | | | |
|---|---|---|---|
| 8,160,391 B1* | 4/2012 | Zhu | G06T 3/4038 382/284 |
| 8,723,859 B1* | 5/2014 | Hirsch | G09G 3/3406 345/418 |
| 2010/0201702 A1* | 8/2010 | Franik | G09G 3/001 345/589 |
| 2011/0141227 A1* | 6/2011 | Bigioi | G06T 7/593 348/36 |
| 2015/0161799 A1* | 6/2015 | Algreatly | G02B 27/017 345/633 |
| 2019/0268599 A1* | 8/2019 | Hannuksela | G06T 3/0062 |

* cited by examiner

*Primary Examiner* — Aaron M Richer
(74) *Attorney, Agent, or Firm* — Birch, Stewart, Kolasch & Birch, LLP

(57) ABSTRACT

A mapping method for a fulldome display, including convert an original image into a deformed image corresponding to the fulldome display; divides the deformed image into at least one first image, at least one second image, and at least one third image; incorporate the third image with the second image to form at least one intermediate image; display image pixels of the first image on display pixels of at least one first displaying module of the fulldome display based on a first mapping relation; display image pixels of the intermediate image on display pixels of at least one second displaying module of the fulldome display based on a second mapping relation. In this way, the increased image pixels of the third image could be transmitted and be displayed.

11 Claims, 15 Drawing Sheets

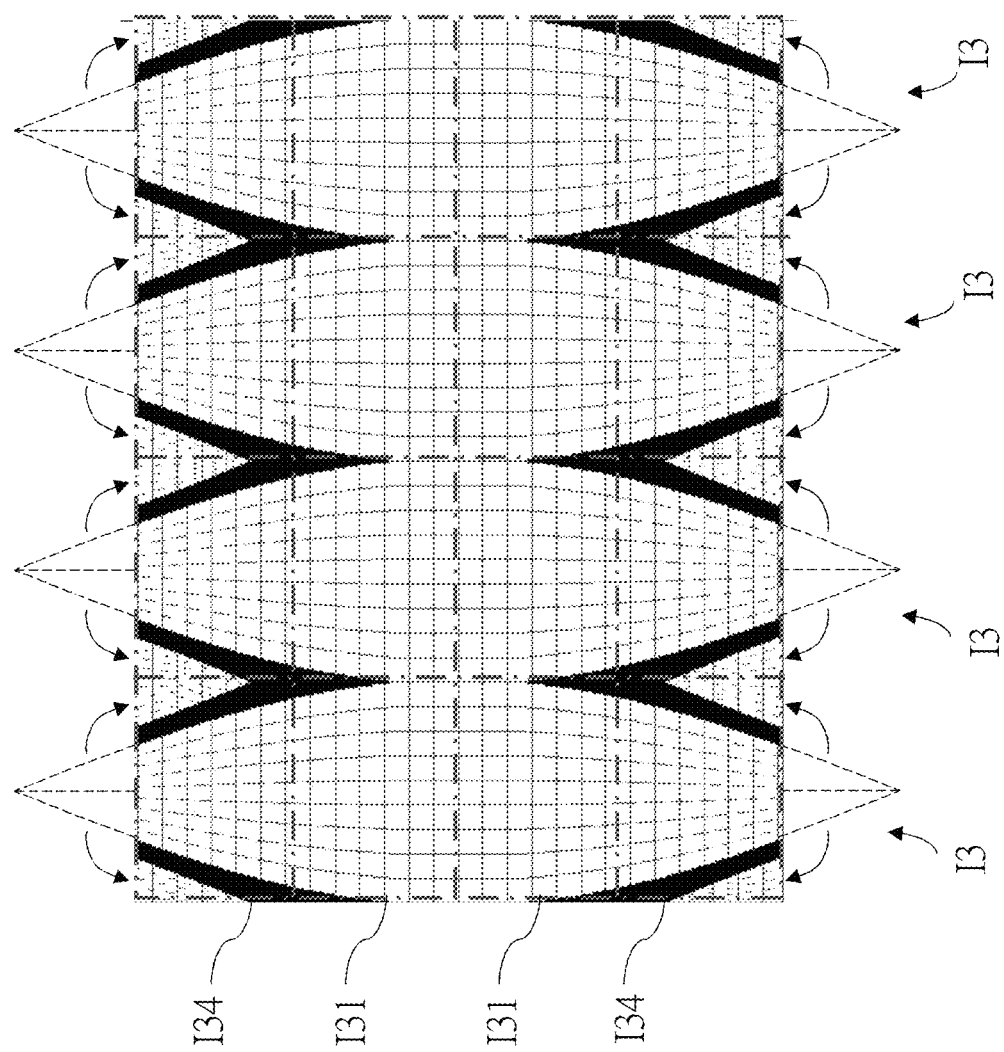

US 11,481,866 B2

MAPPING METHOD FOR FULLDOME DISPLAY

BACKGROUND OF THE INVENTION

Technical Field

The present invention relates generally to a displaying system, and more particularly to a mapping method for a fulldome display.

Description of Related Art

Large-scale flat-panel displays are used to display images for viewers. In order to pursue the presence of watching images, the traditional flat-panel displays are no longer sufficient to meet people's needs for viewing images. Therefore, a fulldome display has been developed to display stereoscopic images and increase the presence of viewing.

A conventional fulldome displaying system 100 is illustrated in FIG. 1, including a medium server 10, a plurality of transmitting devices 12, a plurality of receiving devices 14, and a fulldome display 16, wherein the medium server 10 is connected to each of the transmitting devices 12, and each of the transmitting devices 12 is connected to one of the receiving devices 14.

The fulldome display 16 is stitched by four displaying modules, wherein each of the displaying modules has a plurality of display pixels. Each of the display pixels consists of multi-color LEDs. Each of the displaying modules is connected to one of the receiving devices 14. The fulldome display 16 is two-thirds of a hemisphere, wherein a maximum number of horizontal display pixels (i.e., horizontal resolution) of the fulldome display 16 is 3840, and a maximum number of vertical display pixels (i.e., vertical resolution) is 2160.

Referring to FIG. 2, the medium server 10 converts an original image I1 into a deformed image I2 corresponding to the fulldome display 16, wherein a resolution of the original image I1 is 4K (3840×2160) and a resolution of the deformed image I2 is 4K (3840×2160). A converting process includes calculating a mapping relation between a coordinate of image pixels of the original image I1 and a coordinate of the display pixels of the fulldome display 16 by using Geometry Mapping. Then, performing Image Warping Algorithm to deform and perform Interpolation Method on the image pixels of the original image I1 based on the mapping relation obtained by the Geometry Mapping algorithm to obtain the deformed image I2.

After that, the medium server 10 divides the deformed image I2 into four 2K images and transmits each of the four 2K images to one of the transmitting devices 12; each of the transmitting devices 12 transmits the corresponding 2K image to one of the receiving devices 14; each of the receiving devices 14 displays the image pixels of each of the 2K images on the display pixels of one of the displaying modules based on the mapping relation.

However, when the resolution of the original image I1 and a resolution of the fulldome display 16 increases, the original transmitting devices 12 and the original receiving devices 14 will be insufficient, and the number of the transmitting devices 12 and the receiving devices 14 must be increased accordingly to correspondingly transmit the increased image pixels to the fulldome display 16. As a result, a hardware cost of the conventional fulldome displaying system 100 will increase.

BRIEF SUMMARY OF THE INVENTION

In view of the above, the primary objective of the present invention is to provide a mapping method for a fulldome display, which could transmit the increased image pixels.

The present invention provides a mapping method for a fulldome display, wherein the fulldome display includes at least one first displaying module and at least one second displaying module; the at least one first displaying module has a plurality of display pixels, and the at least one second displaying module has a plurality of display pixels; the mapping method includes steps of.

convert an original image into a deformed image corresponding to the fulldome display;

divide the deformed image into at least one first image, at least one second image, and at least one third image, wherein the at least one first image corresponds to the at least one first displaying module, and the at least one second image and the at least one third image correspond to the at least one second displaying module;

incorporate the at least one third image with the at least one second image to form at least one intermediate image;

display a plurality of image pixels of the at least one first image on the display pixels of the at least one first displaying module of the fulldome display based on a first mapping relation, and displaying a plurality of image pixels of the at least one intermediate image on the display pixels of the at least one second displaying module of the fulldome display based on a second mapping relation.

With the aforementioned design, by incorporating the third image with the second image to form the intermediate image, the first image could be transmitted and displayed on the first displaying module, and the intermediate image with the second image and the third image could be transmitted and displayed on the second displaying module, thereby to transmit the added image pixels of the third image.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 15 is a schematic view showing the image formed by incorporating the third image with the second image according to the second embodiment of the present invention.

DETAILED DESCRIPTION OF THE INVENTION

Figure 1:
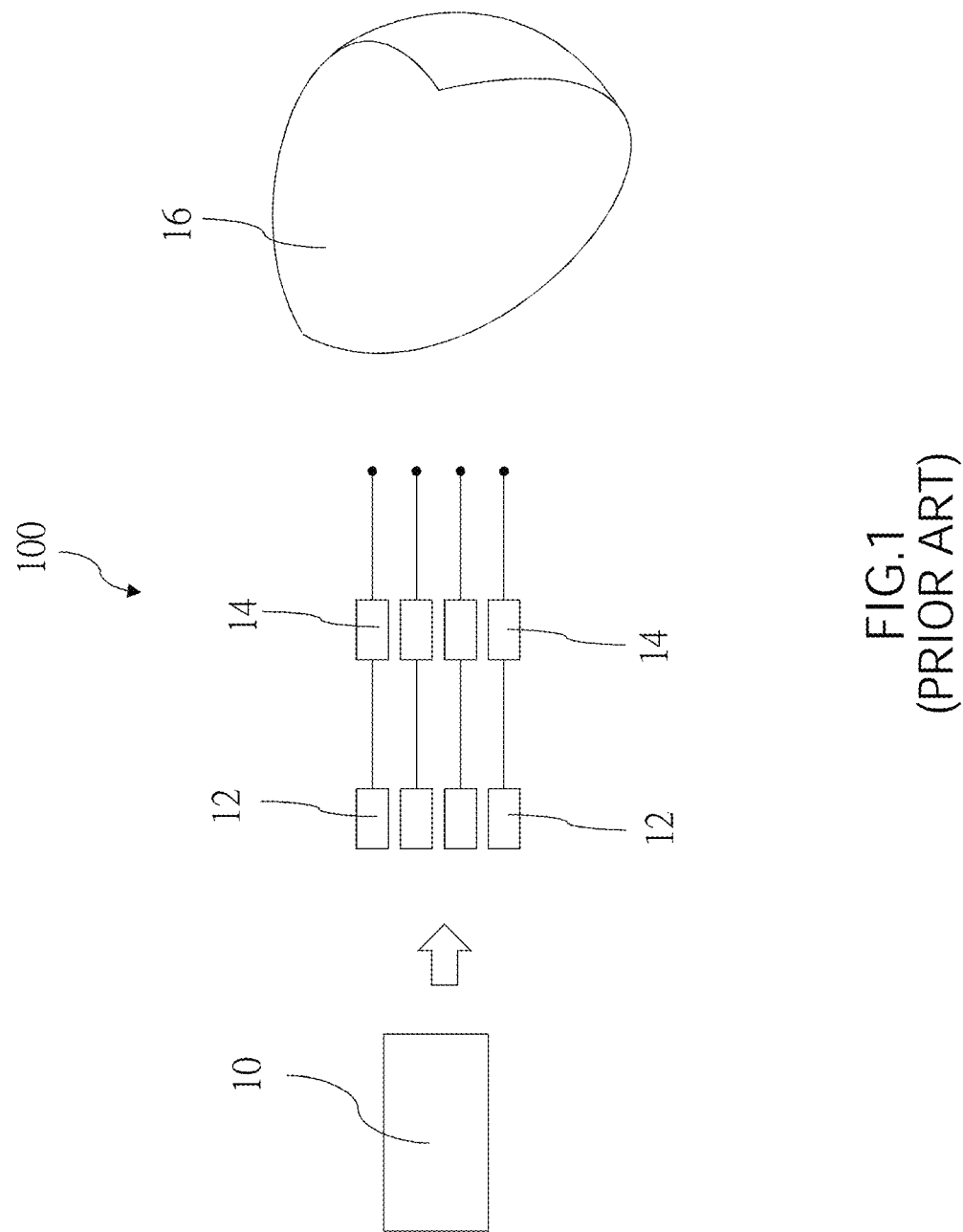
FIG. 1 is a schematic view of the conventional fulldome displaying system.
Figure 2:
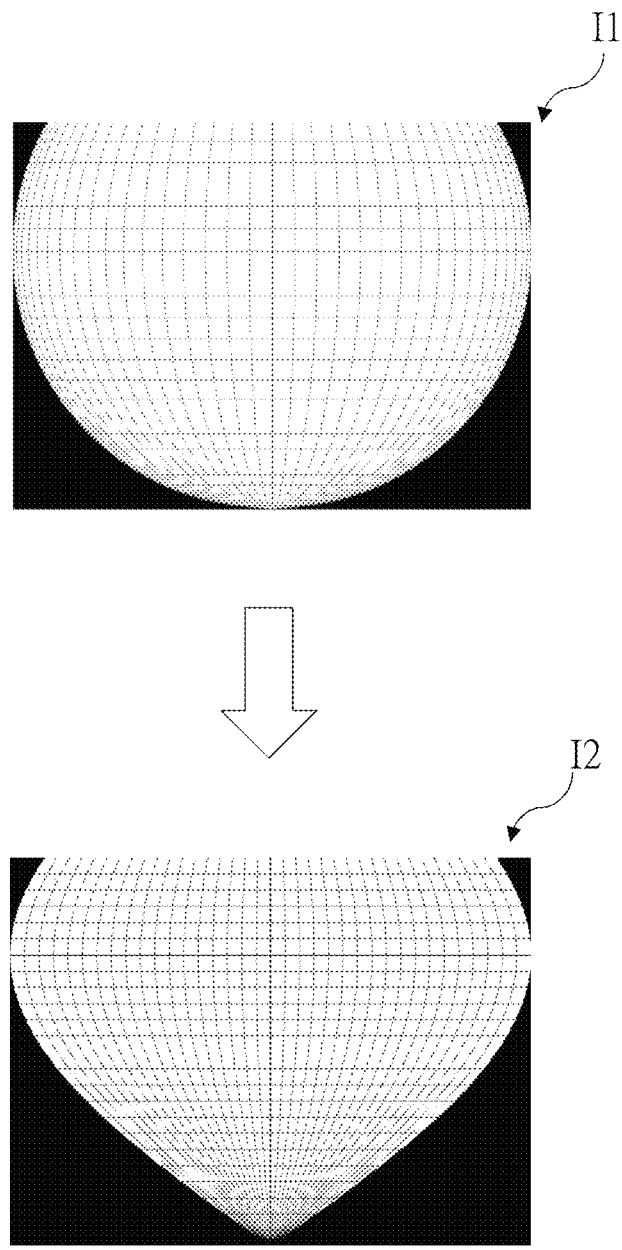
FIG. 2 is a schematic view showing the conventional fulldome displaying system converts the original image into the deformed image.
Figure 3:
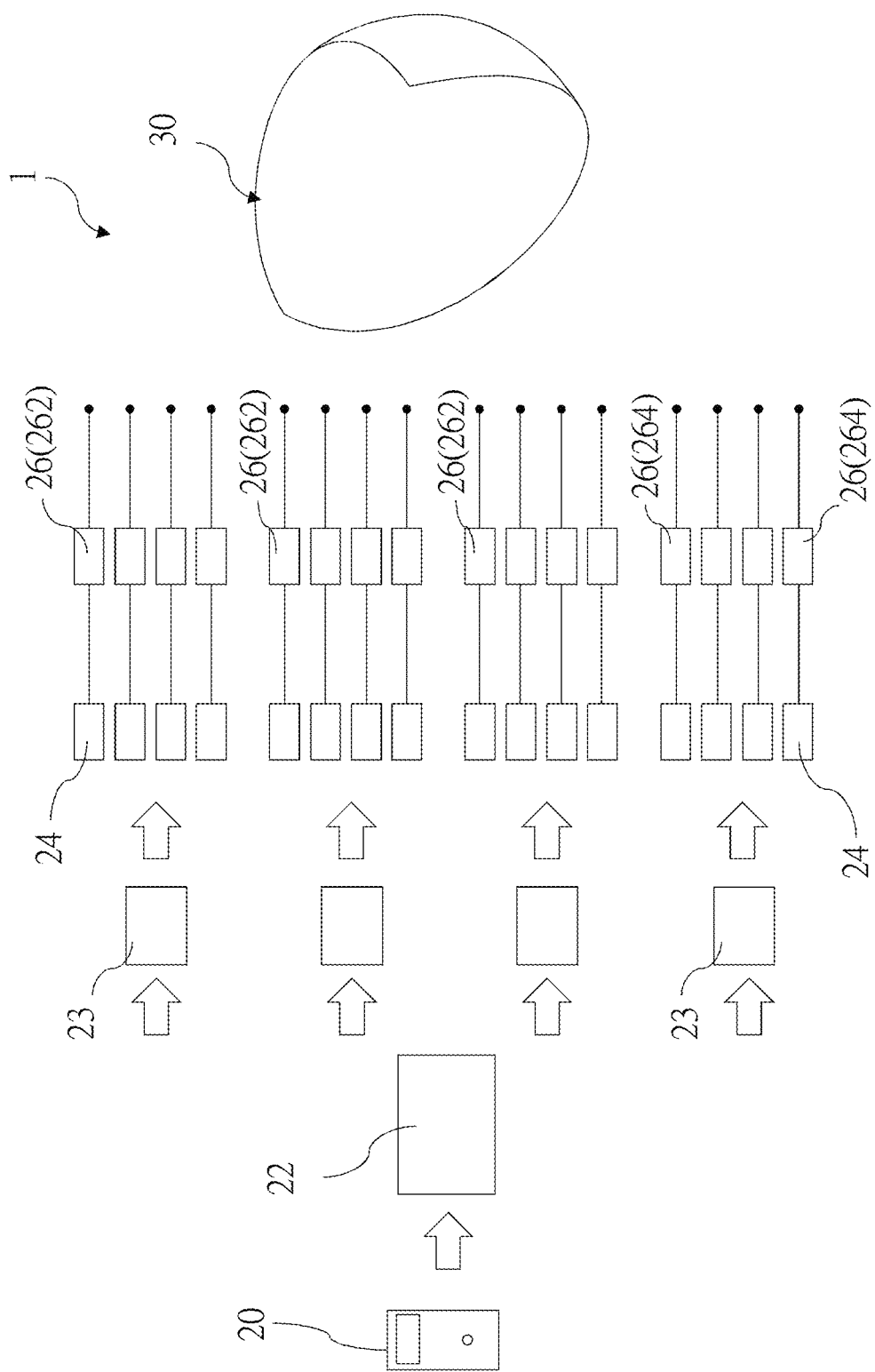
FIG. 3 is a schematic view of the fulldome displaying system according to a first embodiment of the present invention.
Figure 4:
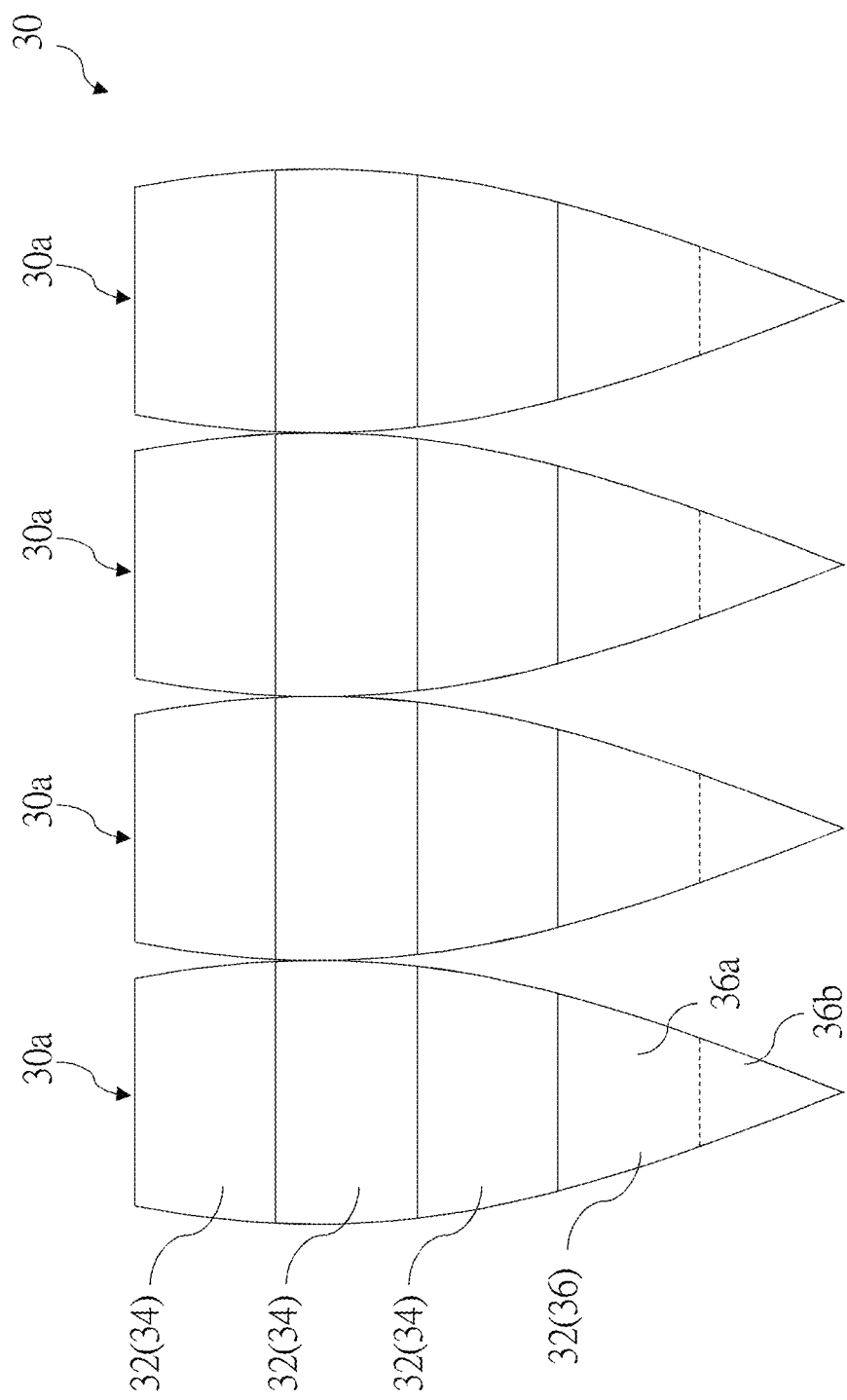
FIG. 4 is a schematic view showing the fulldome display according to the first embodiment of the present invention is expanded.
Figure 5:
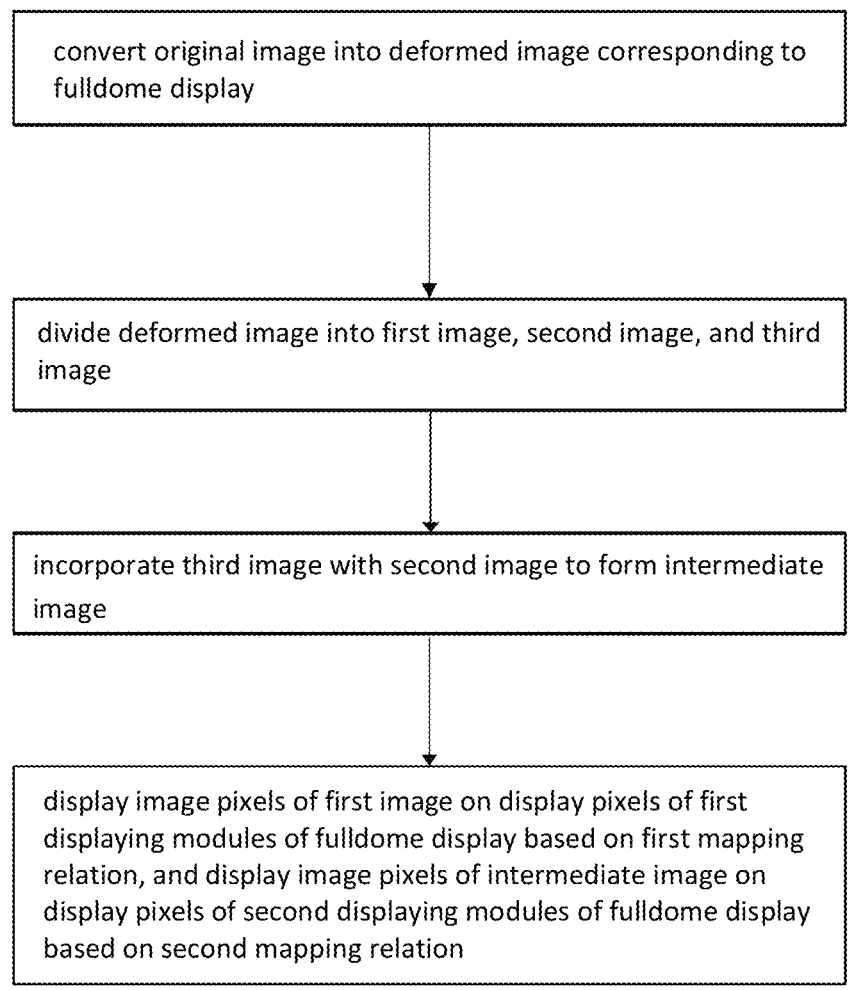
FIG. 5 is a flowchart of the mapping method of the fulldome display according to the first embodiment of the present invention.

A fulldome displaying system 1 according to a first embodiment of the present invention is illustrated in FIG. 3 to FIG. 4 and includes a processing device 20, a medium server 22, a plurality of image splitters 23, a plurality of transmitting devices 24, a plurality of receiving devices 26, and a fulldome display 30. Referring to FIG. 5, a mapping method of the fulldome displaying system 1 will be described later.

In the current embodiment, the processing device 20 is a computer host as an example and is connected to the medium server 22, wherein the medium server 22 is connected to each of the image splitters 23. Each of the image splitters 23 is connected to one of the transmitting devices 24. Each of the transmitting devices 24 is connected to one of the receiving devices 26. Each of the receiving devices 26 is connected to the fulldome display 30.

Referring to FIG. 4, in the current embodiment, the fulldome display 30 is a LED fulldome display 30 as an example and is formed by splicing a plurality of displaying modules 32, wherein each of the displaying modules 32 has a plurality of display pixels consisting of multi-color LEDs. The display pixels of each of the displaying modules 32 are composed of a plurality of rows of display pixels arranged from top down, wherein each of the rows of display pixels is different from one another. In the current embodiment, the fulldome display 30 is two-thirds of a hemisphere as an example, wherein in a vertical direction of the fulldome display 30, latitudes of the fulldome display 30 range between +30 degrees and −90 degrees, and an equator line is at 0 degrees; in a horizontal direction of the fulldome display 30, longitudes of the fulldome display 30 range between −90 degrees and +90 degrees. A maximum number of horizontal display pixels (i.e., horizontal resolution) of the fulldome display 30 is 7680 as an example, and a maximum number of vertical display pixels (i.e., vertical resolution) of the fulldome display 30 is 5120 as an example.

Each of the displaying modules 32 includes a plurality of first displaying modules 34 and a plurality of second displaying modules 36. In the current embodiment, the fulldome display 30 is divided into four equal parts of display area 30a based on longitudes, wherein each of equal parts of display area 30a includes three first displaying modules 34 and a second displaying modules 36 sequentially arranged from top down. A number of rows of display pixels of each of the first displaying modules 34 is the same, and a number of rows of display pixels of each of the second displaying modules 36 is greater than the number of rows of display pixels of each of the first displaying modules 34. The number of rows of display pixels of each of the second displaying modules 36 gradually decreases from top down. Each of the second displaying modules 36 could be divided into two areas (i.e., an upper area 36a and a lower area 36b), wherein a number of rows of display pixels of the upper area 36a is equal to the number of the rows of display pixels of each of the first displaying modules 34; a number of rows of display pixels of the lower area 36b is smaller than or equal to the number of rows of display pixels of the upper area 36a.

The receiving devices 26 include a plurality of first receiving devices 262 and a plurality of second receiving devices 264, wherein each of the first receiving devices 262 is connected to one of the first displaying modules 34, and each of the second receiving devices 264 is connected to one of the second displaying modules 36.

Figure 6:
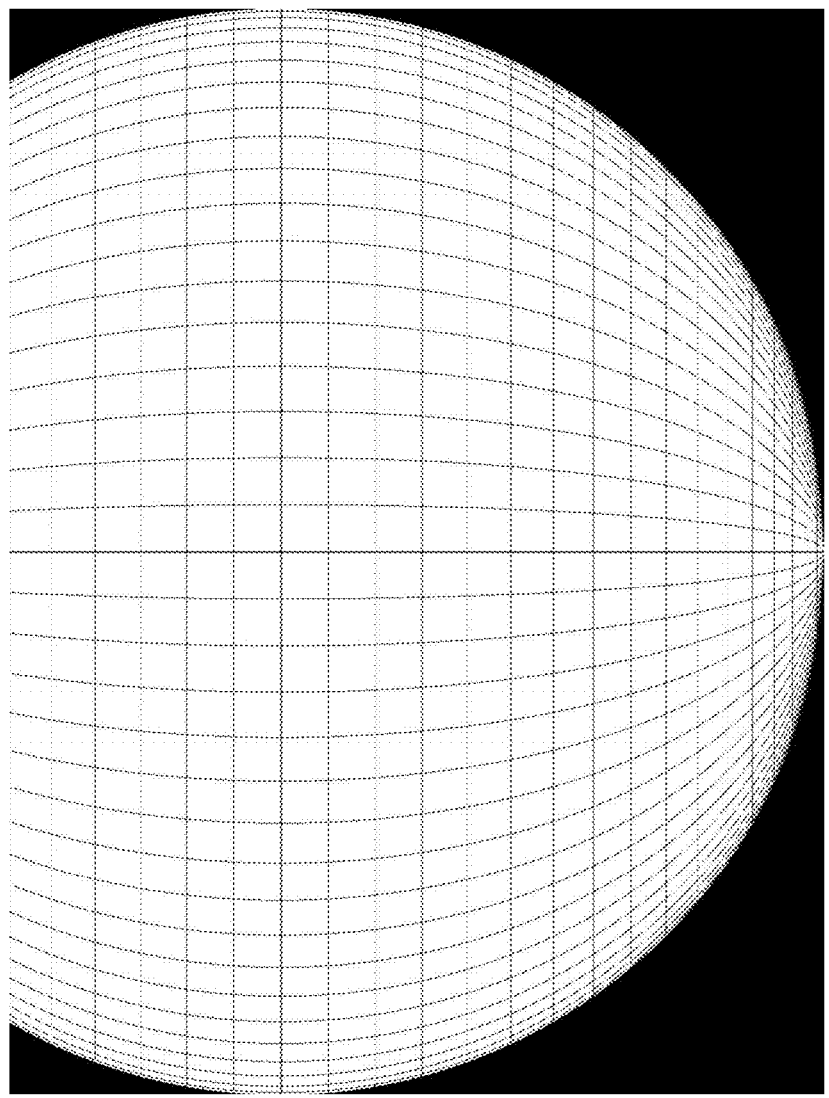
FIG. 6 is a schematic view showing the original image according to the first embodiment of the present invention.
Figure 7:
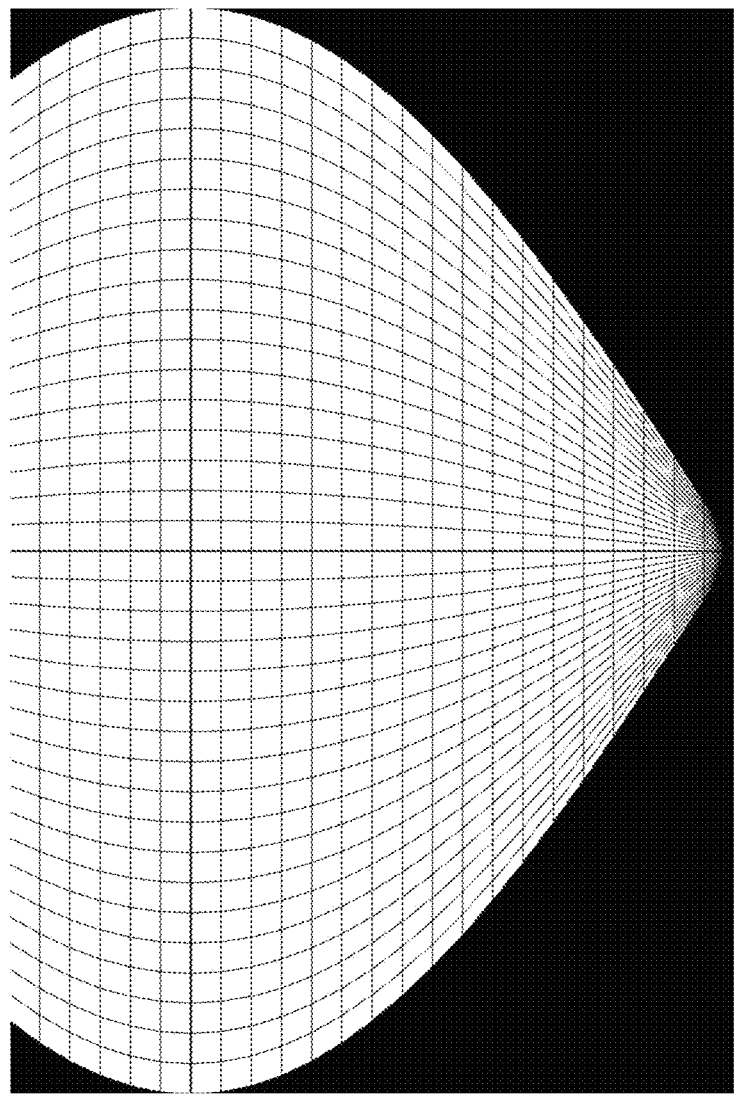
FIG. 7 is a schematic view showing the deformed image according to the first embodiment of the present invention.

The processing device 20 is adapted to receive an original image I1 shown in FIG. 6 and convert the original image I1 into a deformed image I2 shown in FIG. 7 corresponding to the fulldome display 30. In the current embodiment, a number of horizontal image pixels (i.e., horizontal resolution) of the original image I1 is 7680 as an example, and a number of vertical image pixels (i.e., vertical resolution) of the original image I1 is 5120 as an example. In other words, a resolution of the original image I1 is greater than a resolution of 8K (7680×4320). A converting process includes calculating an original mapping relation between a coordinate of image pixels of the original image I1 and a coordinate of the display pixels of the fulldome display 30 by using Geometry Mapping Algorithm. Then, performing Image Warping Algorithm to deform and perform Interpolation Method on the image pixels of the original image I1 based on the original mapping relation obtained by the Geometry Mapping Algorithm to obtain the deformed image I2, wherein a RGB color information of part of image pixels is interpolated to obtain a correct RGB color information, such as Lanczos interpolation or bicubic interpolation, etc.

Figure 8:
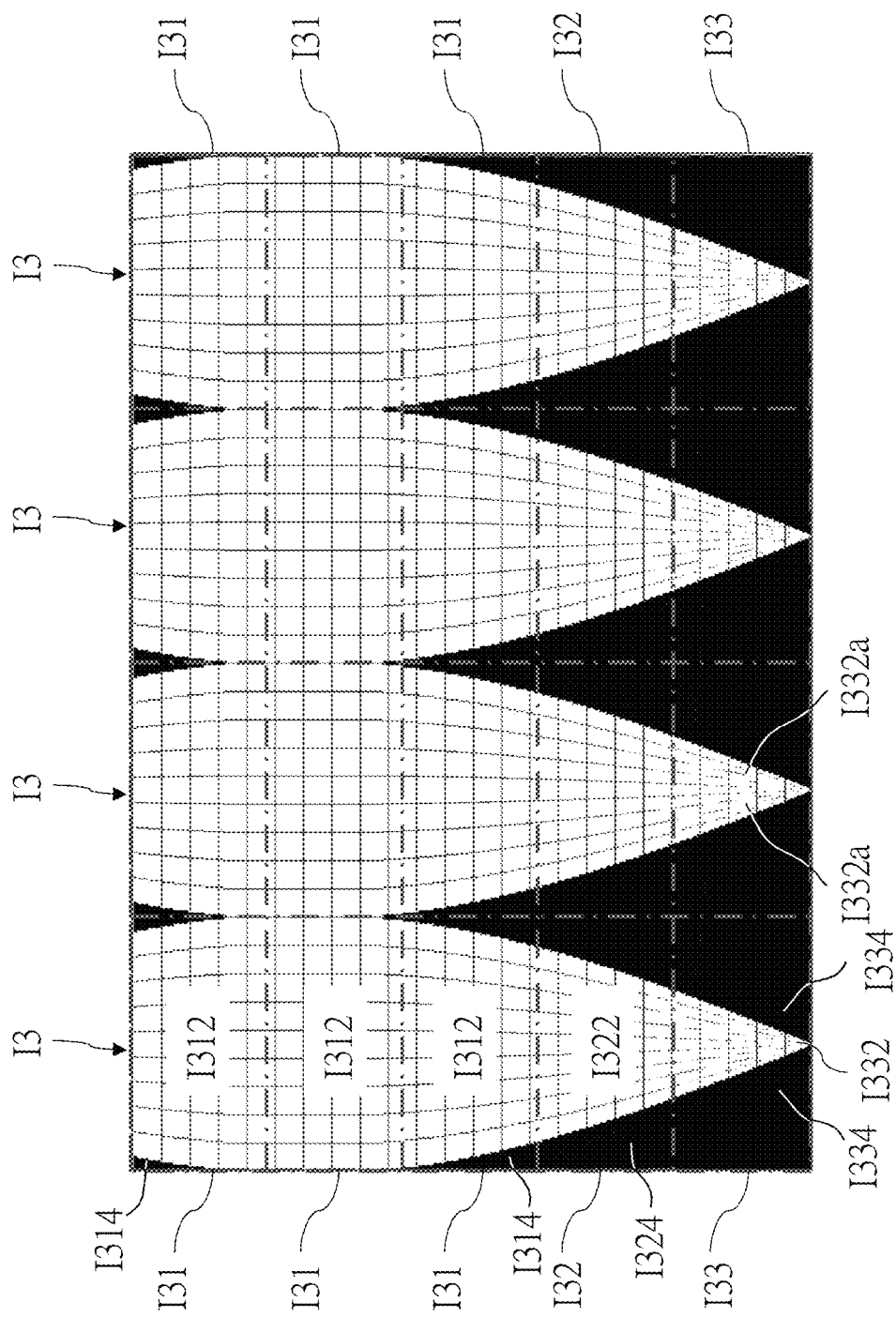
FIG. 8 is a schematic view showing the deformed image according to the first embodiment of the present invention is expanded.

The processing device 20 expands the deformed image I2 corresponding to the longitudes of the fulldome display 30 and divides the deformed image I2 into four equal parts of image I3 shown in FIG. 8, wherein each of equal parts of image I3 corresponds to one of equal parts of display area 30a of the fulldome display 30 shown in FIG. 4. The processing device 20 divides each of equal parts of image I3 into a plurality of first images I31, a second image I32, and a third image I33. In a vertical direction of each of equal parts of image I3, the second image I32 is connected between one of the first images I31 and the third image I33. Each of the first images I31 of each of equal parts of image I3 corresponds to one of the first displaying modules 34 of one of equal parts of display area 30a of the fulldome display 30. The second image I32 and the third image I33 of each of equal parts of image I3 correspond to the second displaying modules 36 of one of equal parts of display area 30a of the fulldome display 30 (i.e., the second image I32 corresponds to the upper area 36a of the second displaying modules 36; the third image I33 corresponds to the lower area 36b of the second displaying modules 36). A number of vertical image pixels (i.e., vertical resolution) of image pixels of the third image I33 is smaller than or equal to a number of vertical image pixels of image pixels of the first images I31 or a number of vertical image pixels of image pixels of the second image I32. A number of horizontal image pixels (i.e., horizontal resolution) of the image pixels of the first images I31, a number of horizontal image pixels of the image pixels of the second image I32, and a number of horizontal image pixels of the image pixels of the third image I33 are the same.

More specifically, the image pixels of the first images I31 include a valid image area I312 and an invalid image area I314, wherein the image pixels in the valid image area I312 are adapted to be displayed on the display pixels of the first displaying modules 34, while the invalid image area I314 is located around a periphery of the valid image area I312 and is not displayed. In practice, the image pixels of the first images I31 could be all valid image area I312.

The image pixels of the second image I32 include at least one first valid image area I322 and at least one invalid image area I324, wherein the image pixels in the first valid image area I322 are adapted to be displayed on the display pixels of the second displaying modules 36. In the current embodiment, the at least one invalid image area I324 includes two invalid image areas I324 respectively located on two lateral sides of the first valid image area I322 in a horizontal direction, wherein the image pixels of the invalid image areas I324 are not displayed.

The image pixels of the third image I33 include at least one second valid image area I332 and at least one invalid image area I334, wherein the image pixels in the second valid image area I332 are adapted to be displayed on the display pixels of the second displaying modules 36. In the current embodiment, the at least one invalid image area I334 includes two invalid image area I334 respectively located on two lateral sides of the second valid image area I332 in a horizontal direction, wherein the image pixels of the invalid image area I334 are not displayed. A number of the image pixels in the second valid image area I332 is smaller than or equal to a number of the image pixels in the invalid image area I334 of the image pixels of the second image I32.

The first original mapping relation corresponds to a mapping relation between a coordinate of image pixels of the first images I31 and a coordinate of display pixels of the first displaying modules 34. The second original mapping relation corresponds to a mapping relation between a coordinate of image pixels of the second image I32 and a coordinate of image pixels of the third image I33 and a coordinate of display pixels of the second displaying modules 36. The first original mapping relation constitutes a first mapping relation. More specifically, the first original mapping relation is a mapping relation between a coordinate of image pixels in the valid image area I312 of the first images I31 and a coordinate of display pixels of the first displaying modules 34; the second original mapping relation is a mapping relation between a coordinate of image pixels in the first valid image area I322 of the second image I32 and a coordinate of image pixels in the second valid image area I332 of the third image I33 and a coordinate of display pixels of the second displaying modules 36.

In order to simplify hardware equipment of the fulldome displaying system 1, the following steps are further performed in the current embodiment.

Figure 9:
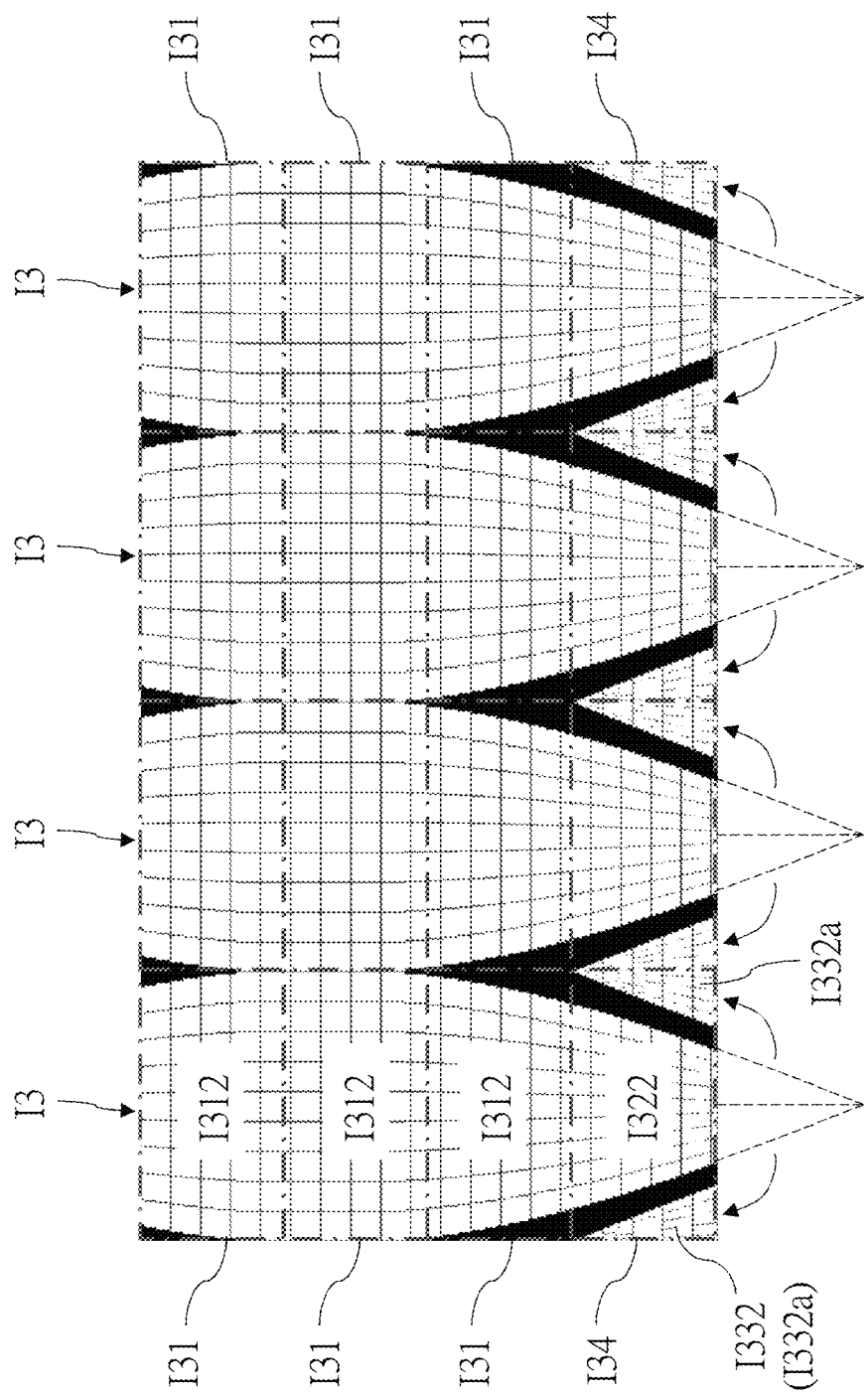
FIG. 9 is a schematic view showing the image formed by incorporating the third image with the second image according to the first embodiment of the present invention.

Referring to FIG. 9, the processing device 20 incorporates each of equal parts of image I3 with the second image I32 to form an intermediate image I34 in each of equal parts of image I3. In the current embodiment, the processing device 20 incorporates the second valid image area I332 of the image pixels of the third image I33 with the invalid image area I324 of the image pixels of the second image I32. More specifically, since a number of the image pixels in the invalid image area I324 of the second image I32 increases along a predetermined direction (e.g. the predetermined direction in the current embodiment is a direction from top down), and a number of the image pixels in the second valid image area I332 decreases along the predetermined direction, the processing device 20 divides the second valid image area I332 into a left valid image sub-area I332a and a right valid image sub-area I332a, and rotates the left valid image sub-area I332a and the right valid image sub-area I332a 180 degrees and incorporates the left valid image sub-area I332a and the right valid image sub-area I332a with the two invalid image area I324 of the second image I32 to replace the image pixels of the original invalid image area I324 of the second image I32 to form the intermediate image I34. In other words, the intermediate image I34 has the first valid image area I322 and the second valid image area I332. In this way, a deformed image I2 with a resolution greater than 8K could be converted into an image with a resolution of 8K (7680× 4320) as shown in FIG. 9.

In other words, before the deformed image I2 being converted, a sum of the number of the vertical image pixels (i.e., vertical resolution) of the image pixels of the third image I33 and the number of the vertical image pixels of the image pixels of the second image I32 is greater than the number of the vertical image pixels of the image pixels of the first images I31, and the number of the vertical image pixels of the image pixels of the third image I33 is smaller than or equal to the number of the vertical image pixels of the image pixels of the second image I32. After the deformed image I2 being converted, a number of vertical image pixels of image pixels of the intermediate image I34 is equal to the number of the vertical image pixels of the image pixels of each of the first images I31 and the second image I32, and a number of horizontal image pixels of the image pixels of the intermediate image I34 is equal to the number of the horizontal image pixels of the image pixels of the first images I31.

In addition, the second original mapping relation is correspondingly converted into a second mapping relation for rearranging the second original mapping relation to form the second mapping relation in response to the image pixels of the third image I33 added in the intermediate image I34.

In the current embodiment, the processing device 20 transmits the first mapping relation corresponding to each of equal parts of image I3 to the first receiving devices 262 for storing the first mapping relation in the first receiving devices 262, and transmits the second mapping relation corresponding to each of equal parts of image I3 to the second receiving devices 264 for storing the second mapping relation in the second receiving devices 264.

After that, the image pixels of the first images I31 of each of equal parts of image I3 are displayed on the display pixels of the first displaying modules 34 of one of equal parts of display area 30a of the fulldome display 30 based on the first mapping relation, and the image pixels of the intermediate image I34 of each of equal parts of image I3 are displayed on the display pixels of the second displaying modules 36 of one of equal parts of display area 30a of the fulldome display 30 based on the second mapping relation. In the current embodiment, the processing device 20 transmits the image shown in FIG. 9 to the medium server 32 for storing the image shown in FIG. 9 in the medium server 32. When the medium server 32 is playing image, the image with the resolution of 8K is divided into four images with a resolution of 4K (3840×2160), and the four images with the resolution of 4K are transmitted to the image splitters 23. Each of the image splitters 23 divides each of the four images with the resolution of 4K into four images with a resolution of 2K (1920×1080), and the four images with the resolution of 2K are respectively transmitted to the transmitting devices 24. Each of the transmitting devices 24 transmits one of the four images with the resolution of 2K to one of the receiving devices 26. In other embodiments, the fulldome displaying system 1 could include merely one image splitter 23 (e.g. 1 to 16 image splitter 23), alternatively, the image splitter 23 could be omitted, and the medium server 32 directly output sixteenth images with a resolution of 2K (1920×1080) to the transmitting devices 24.

The images with the resolution of 2K (1920×1080) received by the first receiving devices 262 are the first images I31, and the first receiving devices 262 correspondingly display the image pixels of the first images I31 on the display pixels of the first displaying modules 34 based on the first mapping relation. The images with the resolution of 2K (1920×1080) received by the second receiving devices 264 are the intermediate images I34, and the second receiving devices 264 correspondingly display the image pixels of the intermediate images I34 on the display pixels of the second displaying modules 36 based on the second mapping relation.

In the current embodiment, each of the first receiving devices 262 correspondingly displays the valid image area I312 of the image pixels of the received first images I31 on the display pixels of the first displaying modules 34 of the fulldome display 30 based on the first mapping relation. Each of the second receiving devices 264 correspondingly displays the first valid image area I322 and the second valid image area I332 of the image pixels of the received intermediate image I34 on the display pixels of the second displaying modules 36 of the fulldome display 30 based on the second mapping relation.

With the second mapping relation, the second receiving devices 264 could correspondingly display the image pixels, which originally belongs to the third image I33 in the intermediate image I34, on the lower area 36*b* of the second displaying modules 36, and correspondingly display the image pixels, which originally belongs to the second image I32 of the intermediate image I34, on the upper area 36*a* of the second displaying modules 36. In this way, the intermediate image I34 could transmit the added image pixels of the third image I33 without adding the number of the transmitting devices 24 and the receiving devices 26, thereby to display the original image I1 with the resolution greater than 8K on the fulldome display 30, effectively simplifying the hardware equipment of the fulldome displaying system 1.

Figure 10:
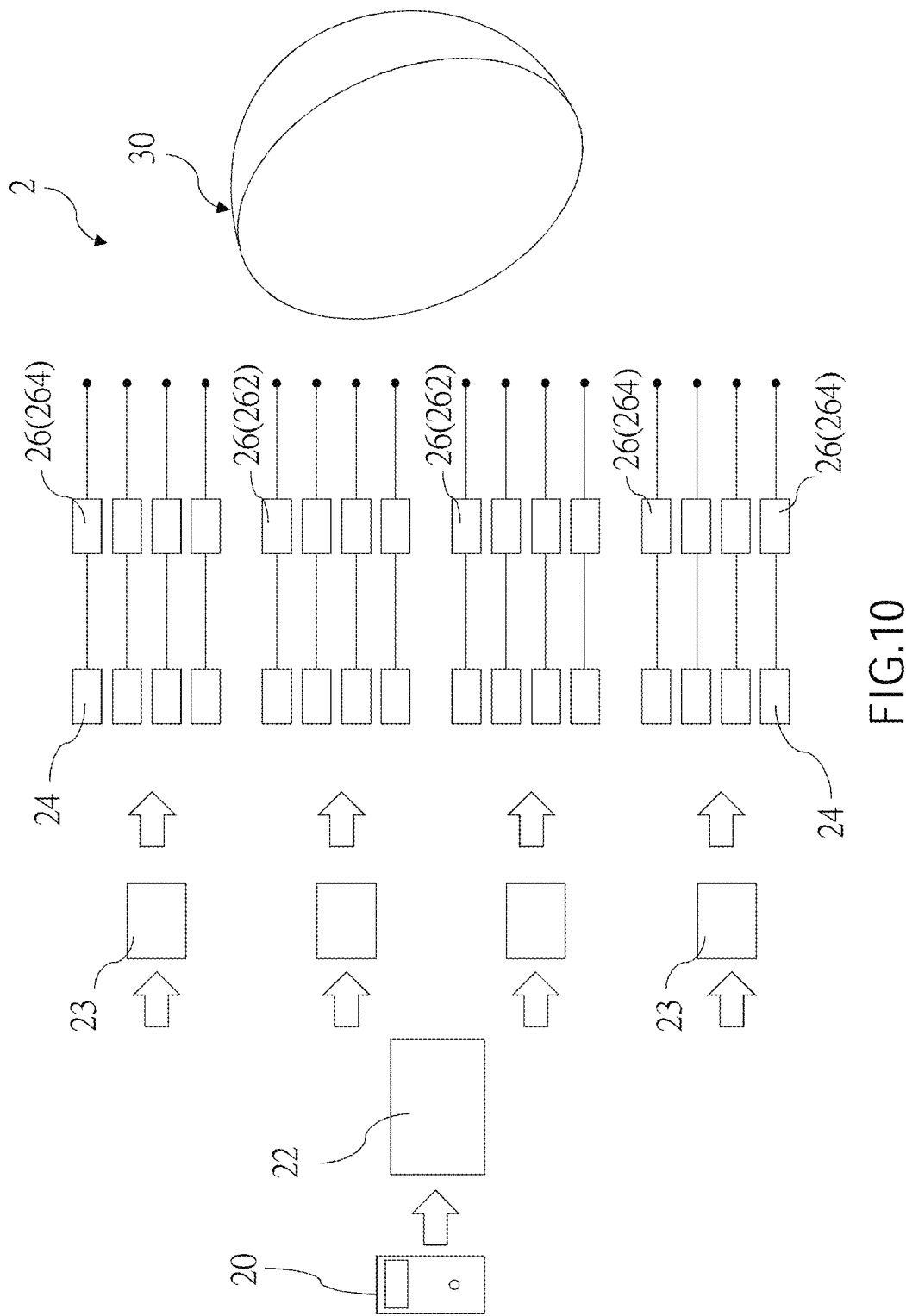
FIG. 10 is a schematic view of the fulldome displaying system according to a second embodiment of the present invention.
Figure 11:
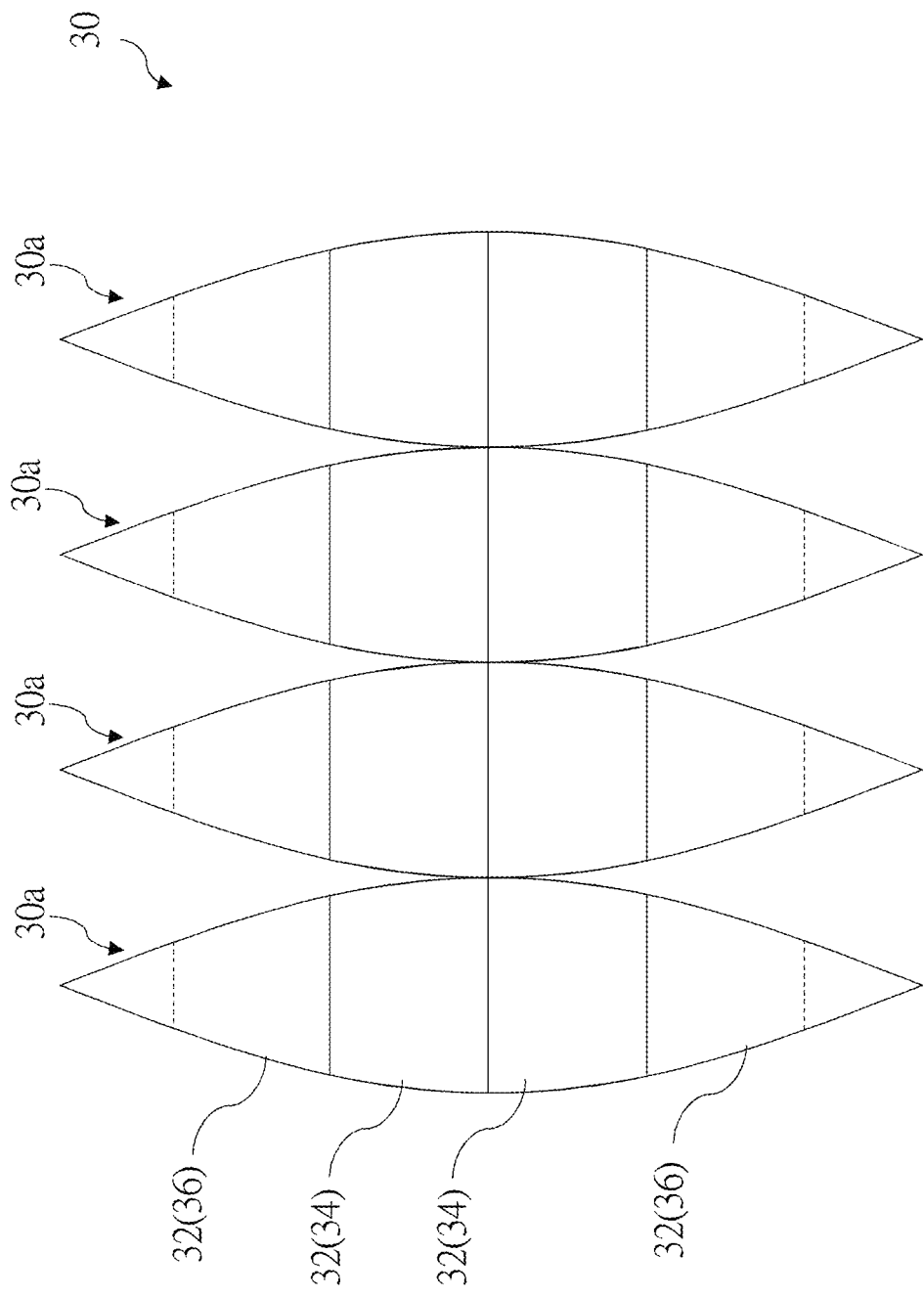
FIG. 11 is a schematic view showing the fulldome display according to the second embodiment of the present invention expanded.

A fulldome displaying system 2 according to a second embodiment of the present invention is illustrated in FIG. 10 and FIG. 11, which has almost the same structure as that of the first embodiment, except that the fulldome display 30 is a hemisphere as an example, wherein in a vertical direction of the fulldome display 30, latitudes of the fulldome display 30 range between +90 degrees and −90 degrees, and an equator line is at 0 degree; in a horizontal direction of the fulldome display 30, longitudes of the fulldome display 30 range between −90 degrees and +90 degrees. A maximum number of horizontal display pixels (i.e., horizontal resolution) of the fulldome display 30 is 7680 as an example, and a maximum number of vertical display pixels (i.e., vertical resolution) of the fulldome display 30 is 5120 as an example.

The displaying modules 32 of the fulldome display 30 include a plurality of first displaying modules 34 and a plurality of second displaying modules 36. In the current embodiment, the fulldome display 30 is divided into four equal parts of display area 30*a* based on longitudes, wherein each of equal parts of display area 30*a* includes two first displaying modules 34 and two second displaying modules 36. The two first displaying modules 34 are disposed between the two second displaying modules 36. A number of rows of display pixels of each of the first displaying modules 34 is the same, and a number of rows of display pixels of each of the second displaying modules 36 is greater than the number of rows of display pixels of each of the first displaying modules 34. The second displaying modules 36 located at a lower position of the fulldome display 30 are the same as that of the first embodiment, and the display pixels of the second displaying modules 36 located at the lower position of the fulldome display 30 have the same arrangement as that of the first embodiment. An arrangement of the display pixels of the second displaying modules 36 located at an upper position of the fulldome display 30 and an arrangement of the display pixels of the second displaying modules 36 located at the lower position of the fulldome display 30 are symmetrical.

The receiving devices 26 includes a plurality of first receiving devices 262 and a plurality of second receiving devices 264, wherein the first receiving devices 262 respectively connected to the first displaying modules 34. A part of the second receiving devices 264 respectively connected to the second displaying modules 36 located at the upper position of the fulldome display 30, and another part of the second receiving devices 264 respectively connected to the second displaying modules 36 located at the lower position of the fulldome display 30.

The fulldome displaying system 2 of the second embodiment could also apply the mapping method of the first embodiment.

Figure 12:
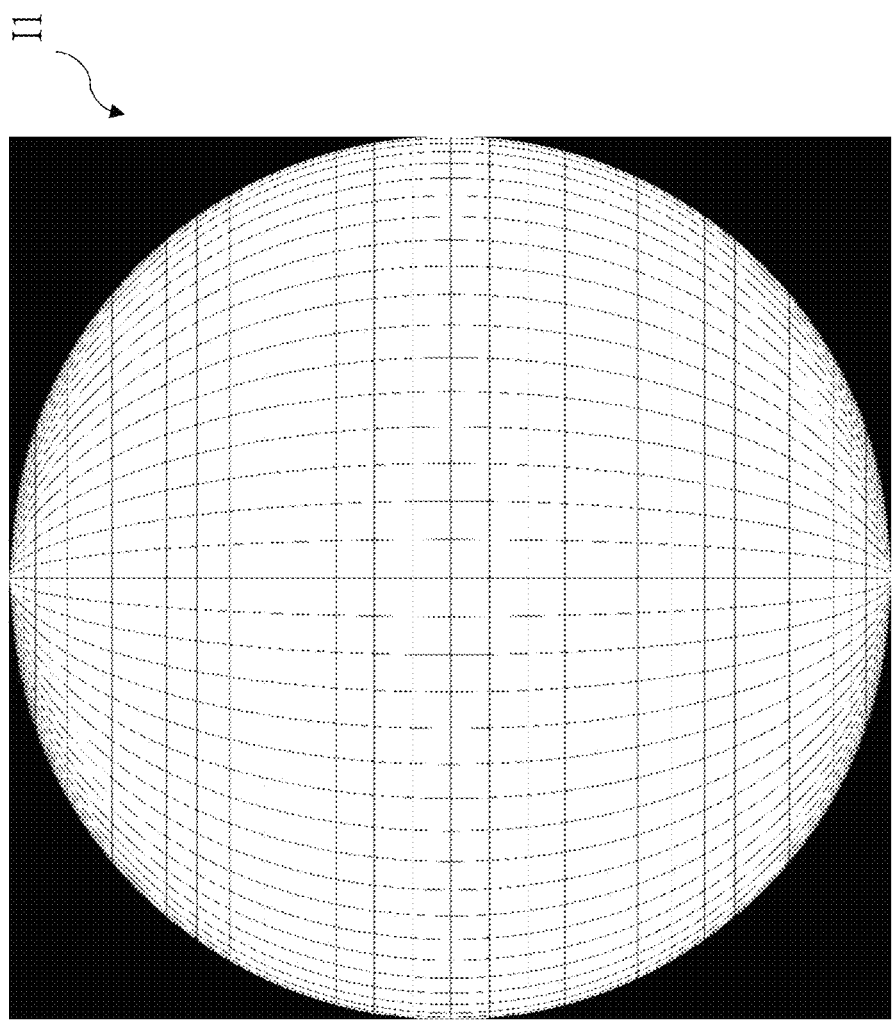
FIG. 12 is a schematic view showing the original image according to the second embodiment of the present invention.
Figure 13:
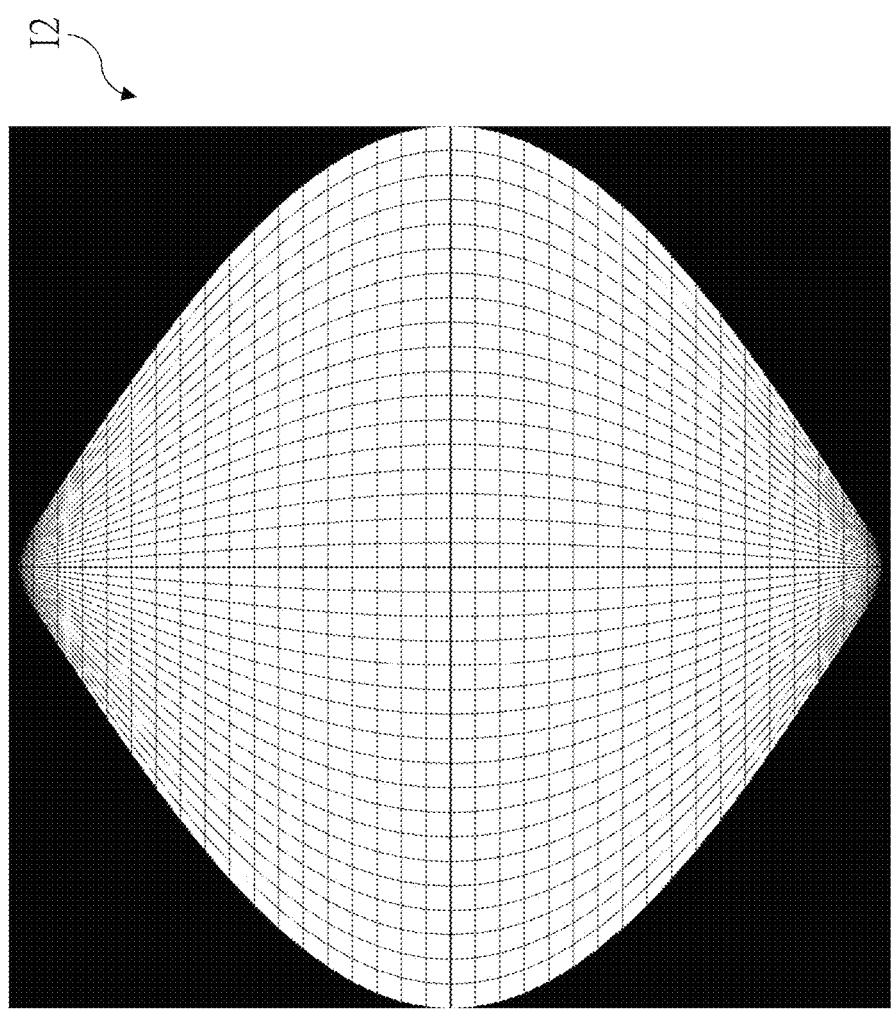
FIG. 13 is a schematic view showing the deformed image according to the second embodiment of the present invention.

The processing device 20 converts the original image I1 shown in FIG. 12 into the deformed image I2 shown in FIG. 12, wherein a resolution of the original image I1 and a resolution of the deformed image I2 are 7680×5120 as an example.

Figure 14:
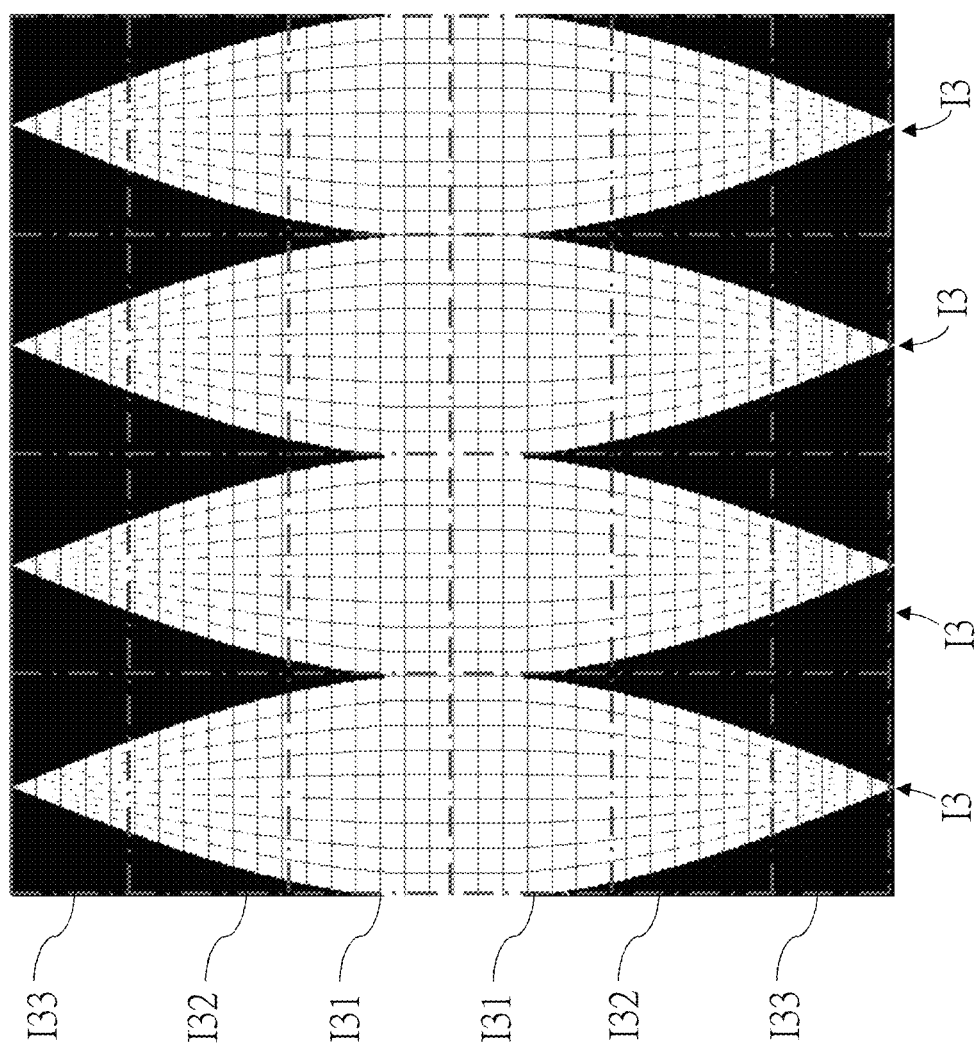
FIG. 14 is a schematic view showing the deformed image according to the second embodiment of the present invention is expanded.

The processing device 20 expands the deformed image I2 corresponding to the longitudes of the fulldome display 30 and divides the deformed image I2 into four equal parts of image I3 shown in FIG. 14, wherein each of equal parts of image I3 includes two first images I31, two second images I32, and two third images I33. In a vertical direction of each of equal parts of image I3, each of the first images I31 is located between the two second images I32, and each of the second images I32 is located between one of the first images I31 and one of the third images I33.

Referring to FIG. 15, the processing device 20 incorporates the third images I33 with the second images I32 of each of equal parts of image I3 to form an intermediate image I34 in each of equal parts of image I3, wherein a resolution of an image shown in FIG. 15 is 8K.

In addition, the way of obtaining the first mapping relation and the second mapping relation of the second embodiment is the same as that of the first embodiment, thus we are not going to describe in detail herein. The processing device 20 transmits the first mapping relation corresponding to each of equal parts of image I3 to the first receiving devices 262 for storing the first mapping relation in the first receiving devices 262, and transmits the second mapping relation corresponding to each of equal parts of image I3 to the second receiving devices 264 for storing the second mapping relation in the second receiving devices 264.

After that, the processing device 20 divides the image with the resolution of 8K shown in FIG. 15 into four images with a resolution of 4K (3840×2160), and the four images with the resolution of 4K are respectively transmitted to the medium server 22. The medium server 22 divides each of the four images with the resolution of 4K into four images with a resolution of 2K (1920×1080), and the four images with the resolution of 2K are respectively transmitted to the transmitting devices 24. Each of the transmitting devices 24 transmits one of the four images with the resolution of 2K to one of the receiving devices 26.

Each of the first receiving devices 262 correspondingly displays the image pixels of one of the first images I31 on the display pixels of one of the first displaying modules 34 based on the first mapping relation. Each of the second receiving devices 264 correspondingly displays the image pixels of one of the intermediate images I34 on the display pixels of one of the second displaying modules 36 based on the second mapping relation.

In this way, the second image I32 and the third image I33 in each of the intermediate images I34 could be restored to be displayed in each of the second displaying modules 36 without adding the number of the transmitting devices 24 and the receiving devices 26, thereby to display the original image I1 with the resolution greater than 8K on the fulldome display 30, effectively simplifying the hardware equipment of the fulldome displaying system 1.

In an embodiment, the fulldome display 30 could include a first displaying module 34 and a second displaying module 36, and the deformed image I2 could include a first image I31, a second image I32, and a third image I33, wherein the first image I31 corresponds to the first displaying module 34; the second image I32 and the third image I33 correspond to the second displaying module 36. The processing device 20 incorporates the third image I33 with the second image I32 to form an intermediate image I34. Then, the processing device 20 correspondingly displays the image pixels of the first image I31 on the display pixels of the first displaying module 34 based on the first mapping relation, and correspondingly displays the image pixels of the intermediate image I34 on the display pixels of the second displaying module 36 based on the second mapping relation.

The original image I1 of the aforementioned embodiments could be a static image or a frame of a dynamic image (e.g. a movie). In addition, the resolution of the original image I1 and the resolution of the fulldome display 30 are not limited to be 7680×5120.

It must be pointed out that the embodiments described above are only some preferred embodiments of the present invention. All equivalent structures and methods which employ the concepts disclosed in this specification and the appended claims should fall within the scope of the present invention.

What is claimed is:

1. A mapping method for a fulldome display, wherein the fulldome display comprises at least one first displaying module, at least one second displaying module, at least one first receiving device connected to the at least one first displaying module, and at least one second receiving device connected to the at least one second displaying module; the at least one first displaying module has a plurality of display pixels, and the at least one second displaying module has a plurality of display pixels; the at least one second displaying module has a first area and a second area; the mapping method comprising steps of:

converting an original image into a deformed image corresponding to the fulldome display;

dividing the deformed image into at least one first image, at least one second image, and at least one third image, wherein the at least one first image corresponds to the at least one first displaying module; the at least one second image corresponds to the first area of the at least one second displaying module and the at least one third image corresponds to the second area of the at least one second displaying module;

incorporating the at least one third image with the at least one second image to form at least one intermediate image, wherein a plurality of image pixels of the at least one second image comprises at least one first valid image area and at least one invalid image area; wherein the at least one first valid image area of the image pixels of the at least one second image does not overlap with the at least one invalid image area; the image pixels in the at least one first valid image area are adapted to be displayed on the display pixels of the at least one second displaying module, and the image pixels in the at least one invalid image area are not displayed; a plurality of image pixels of the at least one third image comprises at least one second valid image area; wherein a number of image pixels in the at least one second valid image area of the image pixels of the at least one third image is smaller than a number of image pixels in the at least one invalid image area of the image pixels of the at least one second image, so that when the at least one third image is incorporated into the at least one second image, the image pixels of the at least one invalid image area of the at least one second image are partially replaced by the image pixels of the at least one second valid image area of the at least one third image to form the at least one intermediate image, wherein in the at least one intermediate image, the image pixels that originally belong to the at least one first valid image area of the at least one second image do not overlap with the image pixels that originally belong to the at least one second valid image area of the at least one third image;

displaying a plurality of image pixels of the at least one first image on the display pixels of the at least one first displaying module of the fulldome display based on a first mapping relation by the at least one first receiving device, and displaying a plurality of image pixels of the at least one intermediate image on the display pixels of the at least one second displaying module of the fulldome display based on a second mapping relation by the at least one second receiving device, wherein the at least one second receiving device displays a part of the image pixels of the at least one intermediate image, which originally belongs to the at least one first valid image area of the at least one second image, on the display pixels of the first area of the at least one second displaying module based on the second mapping relation, and displays another part of the image pixels of the at least one intermediate image, which originally belongs to the at least one second valid image area of the at least one third image, on the display pixels of the second area of the at least one second displaying module based on the second mapping relation, thereby restoring the at least one first image and the at least one intermediate image to the deformed image to be displayed on the fulldome display.

2. The method as claimed in claim 1, wherein the at least one invalid image area of the at least one second image comprises two invalid image areas; in step of incorporating the at least one third image with the at least one second image, the at least one second valid image area of the at least one third image is divided into two valid image sub-areas, and the two valid image sub-areas are respectively incorporated with the two invalid image areas.

3. The method as claimed in claim 2, wherein a number of image pixels in each of the invalid image areas increases in a predetermined direction, and a number of image pixels in each of the valid image sub-areas decreases in the predetermined direction; in step of incorporating the at least one third image with the at least one second image, each of the valid image sub-areas of the at least one third image is rotated by 180 degrees and incorporated with one of the invalid image areas of the at least one second image.

4. The method as claimed in claim 1, wherein in step of converting the original image into the deformed image corresponding to the fulldome display, comprising obtaining an original mapping relation, wherein the original mapping relation comprises a first original mapping relation and a second original mapping relation; the first original mapping relation corresponds to the at least one first image and the at least one first displaying module; the second original mapping relation corresponds to the at least one second image, the at least one third image, and the at least one second displaying module; the first original mapping relation constitutes the first mapping relation; in step of incorporating the at least one third image with the at least one second image, comprising converting the second original mapping relation into the second mapping relation.

5. The method as claimed in claim 4, further comprising storing the first mapping relation into the at least one first receiving device, and storing the second mapping relation into the at least one second receiving device.

6. The method as claimed in claim 1, wherein a number of vertical image pixels of a plurality of image pixels of the at least one third image is smaller than or equal to a number of vertical image pixels of a plurality of image pixels of the at least one second image; a number of vertical image pixels of the image pixels of the at least one intermediate image is equal to the number of vertical image pixels of image pixels of the at least one second image.

7. The method as claimed in claim 6, wherein a sum of the number of vertical image pixels of image pixels of the at least one third image and the number of vertical image pixels of image pixels of the at least one second image is greater than a number of vertical image pixels of the image pixels of the at least one first image.

8. The method as claimed in claim 1, wherein a number of horizontal image pixels of the image pixels of the at least one intermediate image is equal to a number of horizontal image pixels of the image pixels of the at least one first image; a number of vertical image pixels of the image pixels of the at least one intermediate image is equal to a nuber of vertical image pixels of the image pixels of the at least one first image.

9. The method as claimed in claim 1, wherein the at least one second image is located between the at least one first image and the at least one third image.

10. The method as claimed in claim 1, wherein the at least one second image comprises two second images; the at least one third image comprises two third images; the at least one first image is located between the two second images; each of the second images is located between the at least one first image and one of the third images.

11. The method as claimed in claim 1, wherein the number of the image pixels in the at least one second valid image area of the image pixels of the at least one third image is smaller than the number of the image pixels in the at least one invalid image area of the image pixels of the at least one second image; the image pixels of the at least one first valid image area in the at least one intermediate image and the image pixels of the at least one first valid image area are separated by the image pixels of the at least one invalid image area.

* * * * *